United States Patent
Hemes et al.

(10) Patent No.: US 10,831,203 B2
(45) Date of Patent: Nov. 10, 2020

(54) VEHICLE CONTROLLER AND METHOD

(71) Applicant: Jaguar Land Rover Limited, Whitley, Coventry, Warwickshire (GB)

(72) Inventors: Elliot Hemes, Coventry (GB); David Armstrong, Coventry (GB)

(73) Assignee: JAGUAR LAND ROVER LIMITED, Warwickshire (GB)

( * ) Notice: Subject to any disclaimer, the term of this patent is extended or adjusted under 35 U.S.C. 154(b) by 0 days.

(21) Appl. No.: 16/046,289

(22) Filed: Jul. 26, 2018

(65) Prior Publication Data

US 2019/0033872 A1 Jan. 31, 2019

(30) Foreign Application Priority Data

Jul. 31, 2017 (GB) .................................. 1712283.9

(51) Int. Cl.
*G05D 1/02* (2020.01)
*B62D 6/00* (2006.01)
(Continued)

(52) U.S. Cl.
CPC ........... *G05D 1/0212* (2013.01); *B60W 30/00* (2013.01); *B62D 6/002* (2013.01); *B62D 15/029* (2013.01);
(Continued)

(58) Field of Classification Search
CPC .. G05D 1/0212; G05D 1/0248; G05D 1/0251; G05D 1/0255; G05D 1/0257; G05D 1/027; G05D 1/0088; B62D 6/002
See application file for complete search history.

(56) References Cited

U.S. PATENT DOCUMENTS 4,067,520 A * 1/1978 Hill ..................... G01V 3/088
 244/177
6,173,215 B1 1/2001 Sarangapani
(Continued)

FOREIGN PATENT DOCUMENTS

DE 10 2013 007 716 A1 11/2014
DE 10 2013 220 931 A1 4/2015
(Continued)

OTHER PUBLICATIONS

Patents Act 1977: Combined Search and Examination Report under Sections 17 and 18(3), UKIPO Application No. GB1712283.9, dated Dec. 8, 2017, 7 pp.

*Primary Examiner* — Hunter B Lonsberry
*Assistant Examiner* — Daniel L Greene
(74) *Attorney, Agent, or Firm* — Miller Nash Graham & Dunn LLP

(57) ABSTRACT

A method for providing a steering recommendation for a vehicle for negotiating an obstacle includes receiving terrain information, the terrain information indicative of a surface of an obstacle, the surface facing an approaching wheel of the vehicle. The method further includes determining, from the terrain information, at least one characteristic of the facing surface of the obstacle and determining, in dependence on the determined at least one characteristic, a steering recommendation for the wheel to negotiate the obstacle. The method further includes providing the steering recommendation for use in negotiating the obstacle. A computer-readable medium, a controller, a system and a vehicle are also provided.

19 Claims, 4 Drawing Sheets

(51) Int. Cl.
*G05D 1/00* (2006.01)
*B62D 15/02* (2006.01)
*B60W 30/00* (2006.01)

(52) U.S. Cl.
CPC ....... *B62D 15/0265* (2013.01); *G05D 1/0088* (2013.01); *G05D 1/027* (2013.01); *G05D 1/0248* (2013.01); *G05D 1/0251* (2013.01); *G05D 1/0255* (2013.01); *G05D 1/0257* (2013.01)

(56) References Cited

U.S. PATENT DOCUMENTS

| | | | | |
|---|---|---|---|---|
| 8,537,338 | B1 * | 9/2013 | Medasani | G01C 21/32 356/4.01 |
| 8,983,708 | B2 * | 3/2015 | Choe | B62D 1/283 701/25 |
| 2003/0116927 | A1 * | 6/2003 | Quigg | A61G 5/061 280/5.22 |
| 2008/0221729 | A1 * | 9/2008 | Lavarec | G05D 1/0219 700/245 |
| 2009/0319112 | A1 * | 12/2009 | Fregene | B60W 30/16 701/25 |
| 2011/0276225 | A1 * | 11/2011 | Nefcy | B62D 15/027 701/41 |
| 2012/0087546 | A1 * | 4/2012 | Focke | B60R 1/00 382/104 |
| 2013/0231779 | A1 * | 9/2013 | Purkayastha | B25J 9/1697 700/259 |
| 2015/0012165 | A1 | 1/2015 | Israelsson | |
| 2015/0217767 | A1 * | 8/2015 | Kelly | B60K 28/16 701/93 |
| 2015/0224845 | A1 * | 8/2015 | Anderson | B60G 17/019 701/37 |
| 2015/0271991 | A1 * | 10/2015 | Balutis | G05D 1/021 700/264 |
| 2016/0244060 | A1 * | 8/2016 | Fairgrieve | B60W 30/182 |
| 2017/0160745 | A1 * | 6/2017 | Lauffer | G01S 13/931 |
| 2017/0315549 | A1 * | 11/2017 | Oppolzer | G01S 17/89 |
| 2018/0017683 | A1 * | 1/2018 | Tateishi | G01C 21/005 |
| 2018/0074493 | A1 * | 3/2018 | Prokhorov | G06N 3/0454 |
| 2018/0215381 | A1 * | 8/2018 | Owen | B60W 30/143 |

FOREIGN PATENT DOCUMENTS

| | | |
|---|---|---|
| EP | 2 327 574 A1 | 6/2011 |
| EP | 2 883 769 A2 | 6/2015 |
| GB | 2523097 A | 8/2015 |

* cited by examiner

VEHICLE CONTROLLER AND METHOD

CROSS-REFERENCE TO RELATED APPLICATION

This application claims priority under 35 U.S.C. § 119 to Great Britain Application No. 1712283.9, filed Jul. 31, 2017, the content of which is incorporated herein by reference in its entirety.

TECHNICAL FIELD

The present disclosure relates to a vehicle controller and method, and particularly, but not exclusively, to a controller and method for providing a steering recommendation for a vehicle. Aspects of the invention relate to a method, to a computer readable medium, to a controller, to a system and to a vehicle.

BACKGROUND

When riding or driving a vehicle, it is difficult to see what lays directly ahead of the vehicle, and particularly what lays directly ahead of one or more wheels of the vehicle, as the front of the bonnet often obscures the vehicle occupants' field of view. In certain driving conditions, such as when a vehicle is being driven "off road" and may encounter obstacles or obstructions, there is a substantial risk that a vehicle, in particular a wheel of the vehicle, sub optimally or incorrectly contacts the obstacle which may lead to damage to the vehicle, and/or discomfort or injury to any occupants of the vehicle. A wheel contacting a surface or an obstacle at a wrong angle, for example when rock crawling, may pinch a tire and cause damage to the tyre, or lead to unsafe progress over the obstacle allowing the vehicle to slip and become damaged, which may be unsafe for occupants of the vehicle.

It is an aim of the present invention to address the above and related disadvantages.

SUMMARY OF THE INVENTION

Aspects and embodiments of the invention provide a method, a computer readable medium, a controller, a system and a vehicle as claimed in the appended claims.

According to an aspect of the invention, there is provided a method for providing a steering recommendation for a vehicle for negotiating an obstacle. The vehicle has at least one driven wheel. The method comprises receiving terrain information. The terrain information is indicative of a surface of an obstacle, the surface facing an approaching wheel of the vehicle. The method comprises determining, from the terrain information, at least one characteristic of the facing surface of the obstacle. The method comprises determining, in dependence on the determined at least one characteristic, a steering recommendation for the wheel to negotiate the obstacle. The method comprises providing the steering recommendation for use in negotiating the obstacle.

An "obstacle" as described herein may be any hindrance, obstruction, bump, hazard or difficulty near the vehicle that may require the user or driver of the vehicle (or a guidance system within the vehicle itself in the case of semi-autonomous or fully autonomous vehicles) to consider and potentially react. For example, an obstacle may be a rock, boulder or tree stump or a mound or some other obstacle somewhat vertically extending from a driving surface on which the vehicle is travelling. An obstacle may be any identified discrepancy from the surrounding driving surface, although a driving surface may include a series of obstacles. Obstacles may be localised as in the case of individual boulders, or may extend along a driving surface, such as in a gulley. Often in what follows, obstacles are referred to as being located "on" a driving surface, although the skilled person would understand that the obstacle may be separate from and located on the driving surface (such as a loose rock), may be protruding vertically through the surface (e.g. a tree trunk), or may be formed of a discontinuity, abnormality or sudden change in the driving surface itself (such as a mound). When driving along a driving surface featuring a large number of such obstacles, such as in rock crawling, the driver may be required to proceed at a slow speed, steering to precisely position the vehicle on and round the obstacles on the driving surface, and applying the throttle and selecting gearing to apply high torque in a controlled manner in order to make careful progress along an apparently impassable terrain.

In what follows, for convenience, reference is sometimes made to x, y and z axes, or to planes formed by the x, y and z axes. In particular, the x and y axes are defined as being substantially parallel to the driving surface (as averaged out over a reasonable distance), for example on a "flat" driving surface the x and y axes are taken as defining the substantially horizontal plane aligned with the horizon, whereas if the vehicle is driving up a road at an incline, then the x and y axes are defined to be substantially parallel to the road. The x and y axes are perpendicular to each other. The z-axis may be considered as the "vertical" axis if the vehicle is on a flat driving surface—the z axis is perpendicular to both the x-axis and the y-axis. The skilled person will understand that the use of axes and planes herein is for illustrative purposes and these terms do not impart restrictions on the claims.

To "negotiate" an obstacle may be understood as meaning to find a way over, through, or around the obstacle.

The skilled person would appreciate that the word "facing" as used herein is to be understood broadly, and the skilled person would understand what is meant by a "surface". A surface facing an approaching wheel of a vehicle is understood to mean a surface which is substantially exposed to the vehicle such that, based on the direction of travel of the vehicle, an impact between the "facing surface" and a wheel of the vehicle is possible. Accordingly, the surface facing the approaching wheel may be a surface which, if the vehicle were to continue along its direction of travel with no user actions taken, would result in a wheel of the vehicle coinciding/colliding/impacting the surface. However, the surface facing the approaching wheel may also be a surface for which there is a risk of coinciding/colliding/impacting with the wheel of the vehicle if only minor variations to the direction of travel of the vehicle are made. Another way to consider a facing surface of the obstacle would be as a surface that, if the vehicle was entirely transparent or was covered in sensors, would be visible by the vehicle.

Advantageously, by providing a method as described herein, a steering recommendation may be provided to the occupant(s) of a vehicle to assist in steering the vehicle in situations in which the direction of motion of the vehicle may lead to a risk of damage to the vehicle (such as tyre pinching) and/or discomfort or injury to the occupant(s). For example, by providing a method as described herein, a steering recommendation may be provided to the occupant(s) of the vehicle so as for the vehicle to avoid the obstacle or to impact the surface of the obstacle at a more suitable angle and/or velocity.

Receiving terrain information may comprise sensing terrain information using at least one sensor of the vehicle.

Determining at least one characteristic of the facing surface of the obstacle may comprise determining a gradient of the surface. That is, the angle may be the angle of incline of the surface (i.e. an indication of the extension of the surface into the z-direction of the axes of FIG. 1), and over which a driver of the vehicle has no control.

The method may comprise determining, from the terrain information, a height of the obstacle. The method may comprise determining that the height is above a threshold value. Providing a steering recommendation for the wheel to negotiate the obstacle may comprise providing, in dependence on the determination that the height of the obstacle is above the threshold value, a steering recommendation for the wheel to bypass the obstacle. Advantageously, even if the driver is unable to see the obstacle, if the obstacle is too large to traverse, risk of damage to the vehicle is still minimised by navigating around or avoiding the obstacle.

Determining at least one characteristic of the facing surface may comprise determining an angle of the surface relative to a direction of travel of the wheel. The angle may be an angle in the horizontal, or x-y plane, between a projection of the normal vector of the surface onto the x-y plane and a vector defining the direction of travel of the wheel, that is, an angle over which the driver may have some control (see FIGS. 4A and 4B). The angle and position of the surface of the obstacle may be resolved over the surface of the obstacle, depending on the ability of the generated or received terrain information.

Providing a steering recommendation may comprise providing a recommendation to adjust the angle of the direction of travel of the wheel relative to the surface. The recommendation to adjust the angle of the direction of travel of the wheel relative to the surface may comprise an indication to adjust the direction of travel of the wheel such that the adjusted direction of travel is substantially perpendicular to a longitudinal horizontal extent of the surface of the obstacle. Providing a steering recommendation to adjust the angle of the direction of travel of the wheel relative to the surface may comprise adjusting the angle in order to mitigate a risk of damage to the wheel.

The method may comprise monitoring a progression of the vehicle over the terrain. Determining a steering recommendation may comprise determining a steering recommendation in dependence on the progression of the vehicle over the terrain and the determined at least one characteristic of the surface. Monitoring a progression of the vehicle over the terrain may comprise receiving a ground speed signal indicative of a speed over the terrain of the vehicle. Determining a steering recommendation may comprise determining a steering recommendation in dependence on the received ground speed signal and the determined at least one characteristic of the surface.

Receiving a ground speed signal may comprise sensing the ground speed using a rear facing camera.

The method may comprise generating a three-dimensional map of the terrain from the received terrain information.

The method may comprise processing the received terrain data in order to generate a three-dimensional map of the terrain outside of the field of view of one or more sensors of the vehicle.

Providing a steering recommendation or steering advice for the vehicle may comprise providing an audible indication of the steering recommendation or advice. Providing a steering recommendation or steering advice for the vehicle may comprise providing a visual indication of the steering recommendation or advice. Providing a steering recommendation or steering advice for the vehicle may comprise providing a haptic indication of the steering recommendation or advice.

According to a further aspect of the invention there is provided computer software which, when executed by a computer is arranged to perform a method as disclosed herein.

According to another aspect of the invention, there is provided a computer readable medium having instructions stored thereon which, when read by a processing means, cause the processing means to perform a method as disclosed herein. The computer readable medium may be non-transitory. The instructions may be tangibly stored on the computer readable medium.

According to another aspect of the invention, there is provided a controller for a vehicle having at least one driven wheel. The controller is operable to provide a steering recommendation for the vehicle to negotiate an obstacle. The controller comprises input means for receiving terrain information indicative of a surface of an obstacle, the surface facing an approaching wheel of the vehicle. The controller comprises processing means for determining, in dependence on the terrain information, at least one characteristic of the facing surface of the obstacle and determining, in dependence on the determined at least one characteristic, a steering recommendation for the wheel to negotiate the obstacle. The controller comprises output means for providing the steering recommendation for use in negotiating the obstacle.

The processing means may be for determining, from the terrain information, a height of the obstacle. The processing means may be for determining that the height of the obstacle is above a threshold value.

Determining at least one characteristic of the facing surface of the obstacle may comprise determining an angle of the surface relative to a direction of travel of the wheel.

According to another aspect of the invention, there is provided a system for a vehicle having at least one driven wheel, the system being operable to provide a steering recommendation for the vehicle to negotiate an obstacle. The system comprises sensing means for receiving terrain information, the terrain information indicative of a surface of an obstacle, the surface facing an approaching wheel of the vehicle. The system comprises a controller as described herein.

The sensing means may comprise a sensor. For example, the sensing means may comprise a stereoscopic three-dimensional camera. The sensing means may comprise a radar sensor. The sensing means may comprise a light detection and ranging, LIDAR, sensor. The sensing means may comprise a sonar sensor. The sensing means may be for sensing a speed over terrain of the vehicle.

The sensing means may comprise a camera. For example, the camera may be a rear facing camera. The rear facing camera may be mounted in any suitable location of the vehicle, such as on the rear of the vehicle, underneath the vehicle, or on a mirror of the vehicle.

The sensing means may comprise a six-axis accelerometer.

According to another aspect of the invention, a vehicle is provided, the vehicle including a system as described herein.

BRIEF DESCRIPTION OF THE DRAWINGS

One or more embodiments of the invention will now be described, by way of example only, with reference to the accompanying drawings, in which.

Throughout the description and the drawings, like reference numerals refer to like parts.

DETAILED DESCRIPTION

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

In what follows, terrain information comprises information concerning a driving surface on which a vehicle is located, and/or information from which a condition of the driving surface may be inferred. The terrain information may comprise, for example, image data from a field of view of a camera, such as a stereoscopic camera, mounted on a vehicle. The terrain information may comprise, for example, yaw rate measurements which describe the vehicle's angular velocity around its vertical axis, from which indirectly information concerning the driving surface on which the vehicle is located may be determined. A slip angle for the vehicle, which corresponds to the angle between the vehicle's heading and the vehicle's actual movement direction may be determined using the yaw rate.

Figure 1:
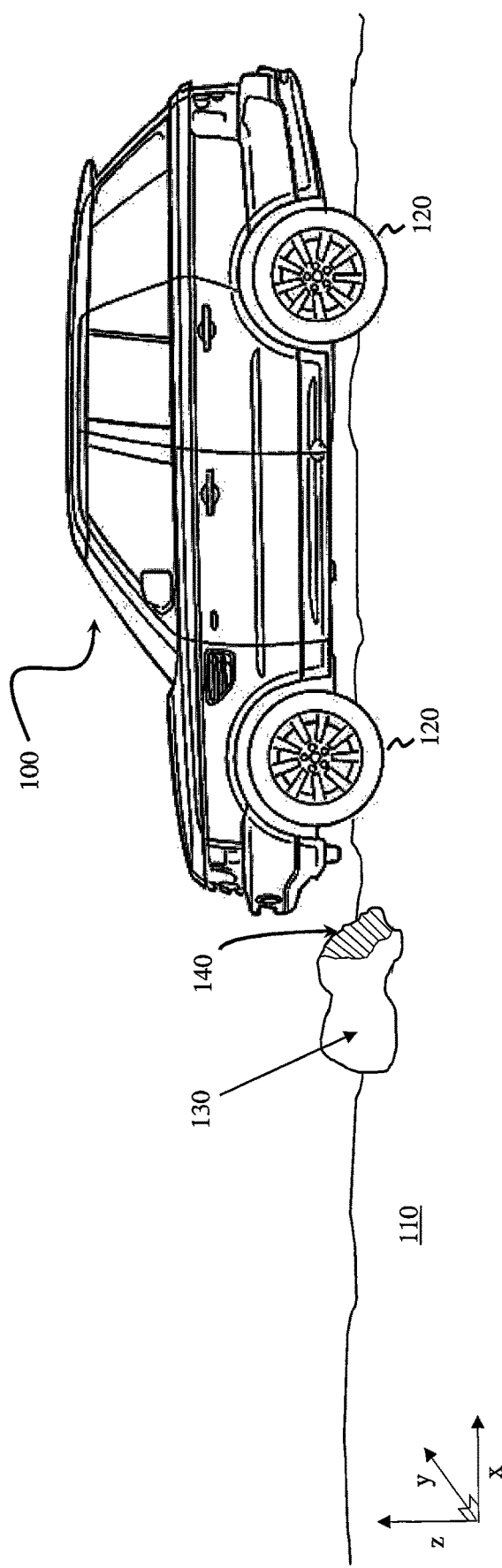
FIG. 1 illustrates a vehicle on a driving surface.

FIG. 1 illustrates a vehicle 100 on a driving surface 110. The vehicle 100 has four wheels 120, two of which are not shown in the figure. The vehicle is situated on a driving surface 110, which may comprise a road, or may comprise an off-road surface. On the driving surface 110, there is located an obstacle 130, which in the present example takes the form of a large rock. The rock in the present example is located ahead of the vehicle 100 in the travelling direction of at least one wheel 120 of the vehicle 100. The axes in FIG. 1 indicate that the driving surface 110 extends substantially in the x-y plane i.e. substantially horizontally. Compared to the driving surface, the obstacle 130 has a profile which extends in the vertical direction i.e. it has a profile in the y-z plane. A surface 140 (shaded in FIG. 1) of the obstacle 130 is substantially facing the approaching wheel 120 of the vehicle (i.e. from the vantage point of sensors on the vehicle, the surface 140 is visible).

The vehicle 100 includes sensing means such as one or more sensors (not shown in FIG. 1) and controlling means, such as a controller. Sensing means and controlling means will be described in more detail below.

Figure 2:
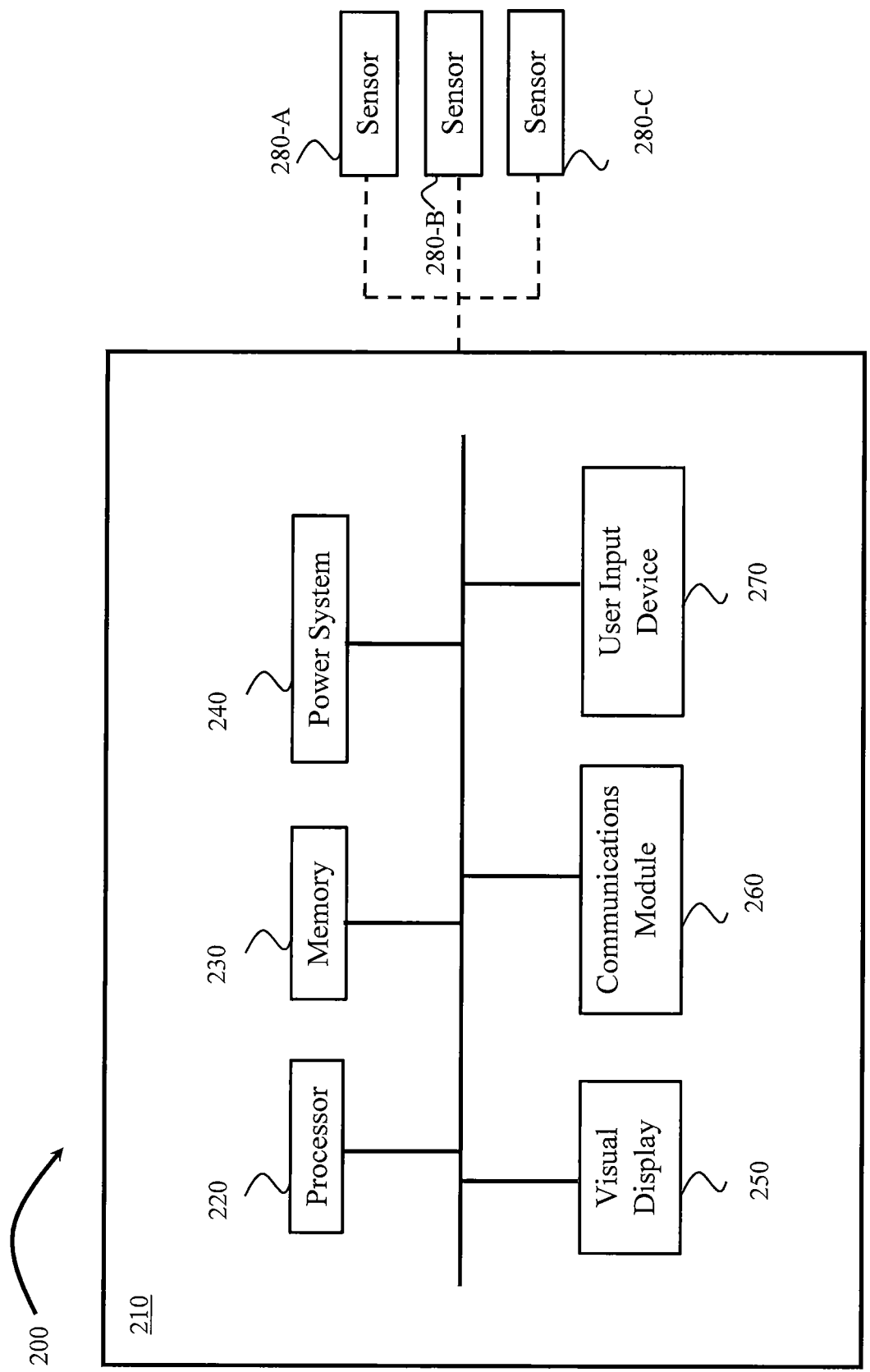
FIG. 2 is a block diagram of a system.

FIG. 2 is a block diagram of a system 200 for a vehicle such as vehicle 100 having at least one driven wheel 120. The system 200 is operable to provide a steering recommendation for the vehicle in order for the vehicle to negotiate an obstacle 130, wherein the obstacle 130 has at least one surface and the surface is substantially facing an approaching wheel of the vehicle.

The system 200 comprises sensing means, which in the embodiment shown in FIG. 2 comprises a plurality of sensors 280-A, 280-B, 280-C. The skilled person will understand that although the sensing means of the present embodiment comprises three sensors, more or fewer sensors may be utilised and any suitable sensing means may be used. The sensing means 280-A, 280-B, 280-C are operable to receive information concerning the surroundings of the vehicle, for example information concerning the driving surface on which the vehicle travels and any potential obstacles or obstructions which are located on that driving surface within sensing range of the sensing means.

The system 200 further comprises controlling means, which in the present embodiment comprises a controller 210. The controller 210 includes a number of user interfaces including a virtual or dedicated user input device 270.

Referring to the figure, the controller 210 comprises input means for receiving terrain information from the sensing means 280-A, 280-B, 280-C. In the example shown, the input means comprises a communications module 260 configured to send and receive communications between the processing means 220 and the sensing means 280-A, 280-B, and 280-C. For example, the communications module 260 may be used to receive terrain information from at least one of the vehicle's sensors, the terrain information indicative of an obstacle 130 located in the vicinity of the vehicle. Multiple sensors may be used, for example, in order for the processing means to generate a three-dimensional map of the terrain around the vehicle and any obstacles located thereon or therein.

The controller 210 of the present embodiment comprises processing means in the form of a processor 220, a storage means in the form of a memory 230, and a powering means in the form of a power system 240. The processor may comprise one or more electronic processing devices 220.

The processing means 220 is configured to receive data, access the memory 230, and to act upon instructions received either from said memory 230, from communications module 260 of from user input device 270. The processor is arranged to receive terrain information from the communications module 260, the terrain information indicative of any obstacles within range of the sensing means 280-A, 280-B or 280-C, and indicative of a surface of any of those obstacles, particularly a surface facing an approaching wheel of the vehicle. The processor 220 is arranged to determine, from the terrain information, at least one characteristic of a facing surface of an obstacle. The processor 220 is further arranged to determine, in dependence on the at least one characteristic, a steering recommendation for a wheel of the vehicle to negotiate the obstacle.

The controller 210 further comprises output means for providing the steering course for the vehicle which, in the present example, is an electrical output, configured to output a control signal to a visual display unit 250. The processor 220 is therefore arranged to provide the steering course for the vehicle via the visual display 250, although the skilled person would understand that the steering course may be provided in any suitable way, for example using an audible notification.

The skilled person would understand that the controller 210 may be separate to the vehicle 100. For example, the controller 210 may be provided in the form of a standalone module connectable with an interface of the vehicle 100. In this way, the controller 210 may communicate with the sensing means 280 of the vehicle 100 via the communications module 260. The skilled person would also understand that the controller 210 may be built into or installed in the vehicle 100, such that the processing means 220 is a processing means of the vehicle 100 and the input means and output means are respectively input means and output means of the vehicle.

Figure 3:
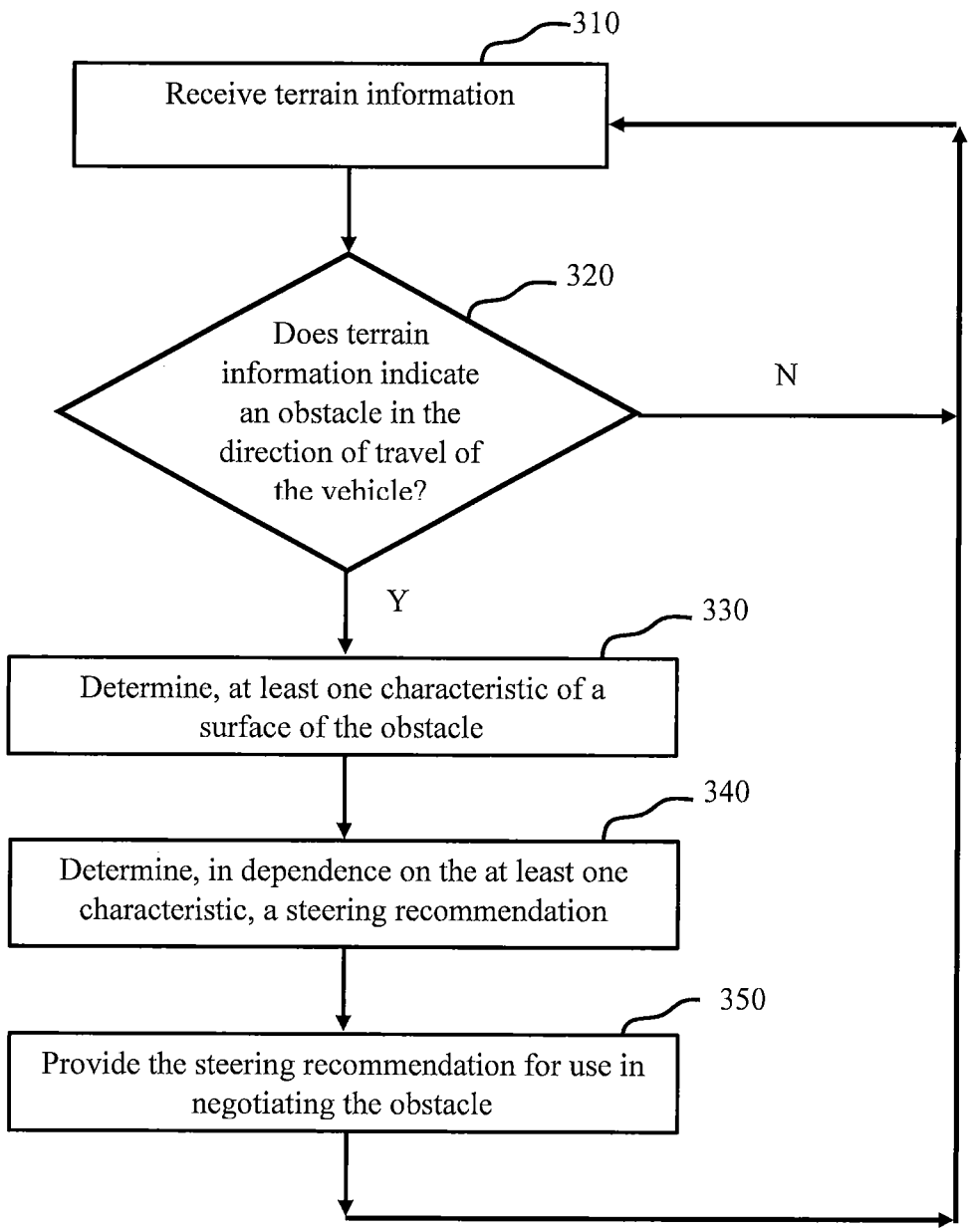
FIG. 3 is a flow chart.

FIG. 3 is a flowchart of a method according to an embodiment. The method may be performed by a computing device such as controller 210. The method may be used, for example, to provide a steering course to a vehicle 100 for use in negotiating an obstacle 130.

At step 310, terrain information is received. The terrain information pertains to the terrain or driving surface on which the vehicle 100 is travelling. The terrain information may be received from sensing means 280 on the vehicle 100. Alternatively, the terrain information may be from a third party, for example, from a satellite system or a vehicle-to-vehicle communication.

The terrain information may be in any suitable format. For example, the terrain information may comprise sensed data from a sensor 280 on the vehicle 100, such as a stereoscopic three-dimensional camera. The stereoscopic three-dimensional camera may comprise two or more lenses with a separate image sensor or film frame for each lens and so may be able to capture three-dimensional images of the terrain or ground within sensing range of the vehicle 100.

Receiving the terrain information may comprise receiving a continuous datastream, or may comprise receiving periodic or aperiodic data inputs comprising the terrain information. The processor 220 of the controller 210 is able to process the received data to interpret the terrain information.

The processing means 220 may be configured to propagate the terrain information as it passes out of the field of view of the sensing means 280-A, 280-B, and 280-C towards the front wheels, under the vehicle towards the back wheels, and away behind the vehicle, and the track as precisely as possible the position of the vehicle, such as the four wheels of the vehicle, in relation to the terrain information, and any obstacles therein, as it passes over the driving surface. This processing to estimate a current location of the vehicle in relation to a propagation of the terrain information may be based on inputs indicating vehicle speed and location from ground speed sensors or rear-facing cameras (not shown) and/or other positioning systems, such as inertial navigation systems, gyroscopes, accelerometers, or other sensors.

At step 320, a determination is made, based on or dependent on the received terrain information, as to whether or not there are any obstacles in the vicinity of the vehicle 100. In particular, a determination is made as to whether or not any of those obstacles are in the direction of travel of at least one wheel of the vehicle such that if the vehicle were to continue travelling in that direction of travel, the wheel would coincide with the obstacle. If it is determined that there are no identified obstacles in the vicinity of the vehicle then no further action is taken—the method returns to 310 and further terrain information is received and processed. If, on the other hand, it is determined that there is an obstacle in the likely direction of travel of the vehicle, then the method proceeds to step 330.

At step 330, a determination is made of at least one characteristic of a facing surface of the obstacle, the facing surface being that surface of the obstacle most likely to coincide with a wheel of the vehicle if the vehicle continues along its direction of travel. The characteristic may comprise, for example, an angle of slope of the obstacle relative to the driving surface on which the obstacle is located, an angle of impact of the wheel relative to the surface etc.

For example, when the terrain image is captured by a stereoscopic camera, or by multiple camera, the processor may process the captured image(s) to determine the range to various points on the obstacle. In this way, the angle of the surface of the obstacle relative to the ground on which the vehicle travels may be determined, i.e. the slope or gradient of the surface. Terrain information may be analysed, for example, to determine the nature of the surface (e.g. rock or gravel).

Figure 4A:
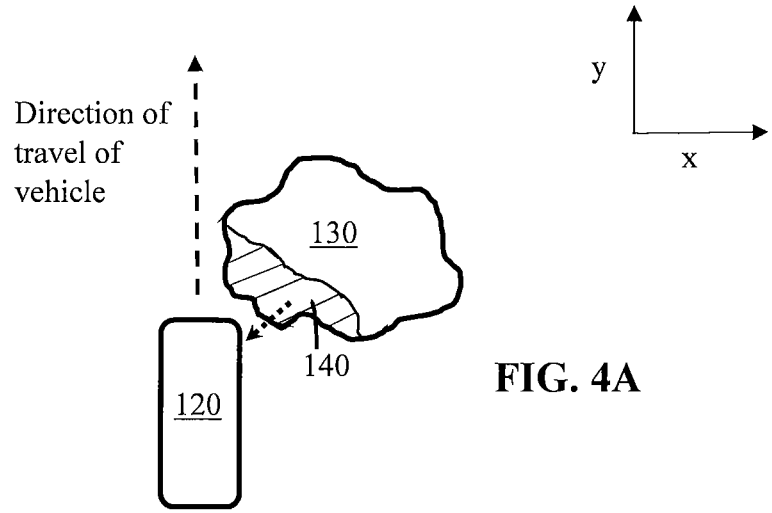
FIG. 4A illustrates a wheel of a vehicle approaching an obstacle at an oblique angle.
Figure 4B:
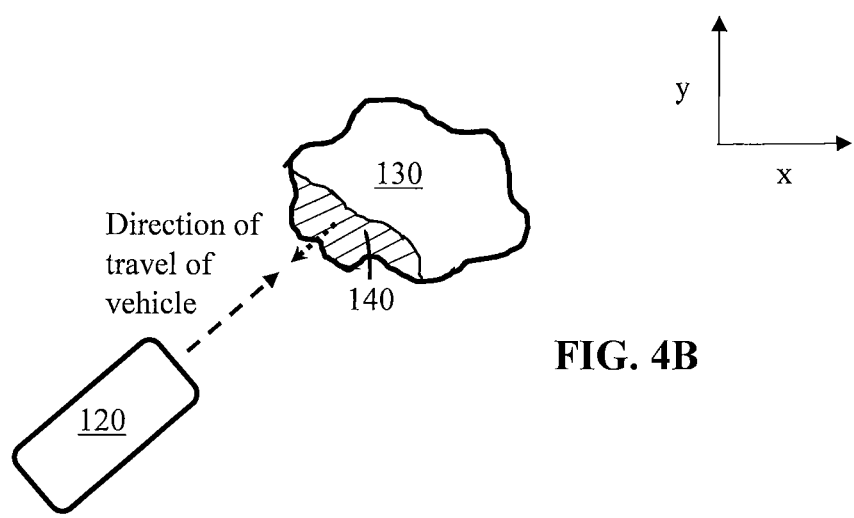
FIG. 4B illustrates a wheel of a vehicle substantially directly approaching an obstacle.

The characteristic of the surface may comprise, for example, the slope of the surface relative to the direction of travel of the wheel (see FIGS. 4A and 4B). In FIG. 4A, a wheel 120 of the vehicle 100 is shown to be travelling in a direction at an angle relative to the obstacle 130. That is, the (shaded) surface 140 of the obstacle 130 faces (as projected onto the substantially horizontal plane on which the vehicle travels, and as indicated by the arrow in FIG. 4A) at an angle relative to the direction of travel of the wheel 120. In some circumstances, such as when the slope of the surface is too steep or when only the edge of the wheel 120 will impact the obstacle 130, impacting the obstacle 130 at an oblique angle may result in pinching of a tyre on the wheel 120 or other damage to the wheel 120. In FIG. 4B, a wheel 120 of the vehicle 100 is shown to be travelling in a direction substantially in line with the surface of the obstacle. In this situation, pinching or other damage is less likely to occur. That is, the (shaded) surface 140 of the obstacle 130 directly faces (as projected onto the substantially horizontal plane on which the vehicle travels and as indicated by the arrow in FIG. 4B) plus or minus a few degrees, the direction of travel of the approaching wheel 120.

At step 340, a determination is made of a steering recommendation for the wheel to negotiate the obstacle 130, the determination based on the determined characteristic of the surface. If, for example, it is determined that the angle between the slope of the surface and the direction of the travel of the wheel is beyond a certain threshold such that there is a risk of damage to the wheel 120 of the vehicle (FIG. 4A), then the steering recommendation may comprise an instruction on how to better impact the obstacle 130 such that pinching will not occur (FIG. 4B). That is, the recommendation may comprise a steering instruction to turn the wheel 120 towards the obstacle 130. The steering recommendation may comprise a steering recommendation to turn the wheel away from the obstacle 130.

The steering recommendation is determined based on the determined characteristic of the surface, but may also be determined based on other factors. For example, the height of the obstacle 130 may be determined from the terrain information. The processor 220 may determine whether or not the height of the obstacle 130 is above a predetermined threshold and determine a steering recommendation accordingly. For example, if it is determined that the height of the obstacle 130 is above the threshold, then the recommendation may comprise an indication to steer the wheel 120 away from the obstacle 130 such that the obstacle 130 is avoided or bypassed; alternatively, if the height is below the threshold, then the processor may determine otherwise.

The steering recommendation may also be determined based on a ground speed or ground velocity of the vehicle 100. For example, the controller 210 may receive information from one or more sensors 280 such as a rear-facing camera, which may be rear-mounted or placed, for example, on a wing mirror of the vehicle. As described above, the sensors and/or the controller 210 may monitor a progression of the vehicle 100 over the terrain or ground, and the steering recommendation may be determined based in part on the progression. For example, the velocity of the vehicle 100 is likely to change the impact of a wheel 120 of the vehicle 100 with the obstacle 130, and is also likely to change the potential effect of that impact, and the reaction times of a user of the vehicle to any recommendation. Accordingly, the nature of the recommendation may vary depending on the progression of the vehicle over the terrain. Further, the steering recommendation may be based on the terrain information, or determined characteristics of surfaces of objects or obstacles in the terrain, in the monitored progression of the vehicle over the terrain information. For example, the steering recommendation may be to avoid a collision between the underside of the vehicle and an obstacle, or to achieve a desired alignment between a rear wheel of the vehicle and a surface of an object or obstacle.

At step 350, the steering recommendation is provided for use in negotiating the obstacle 130. The steering recommendation may be provided to the user of the vehicle via a visual display and/or an audible sound, or via any other suitable means. The method then returns to step 310.

The method described above in relation to FIG. 3 can be modified in any of a number of ways as would be appreciable to the skilled person.

Variations of the described embodiments are envisaged, for example, the features of all of the disclosed embodiments may be combined in any way and/or combination, unless such features are incompatible.

The vehicle may comprise any wheeled vehicle, for example a car, a van, a lorry, a bike or a tractor. The vehicle may be a human-driven vehicle or an autonomous or semi-autonomous vehicle.

Information, such as the terrain information, may be received from any suitable source. For example, information may be received through a communications module of the vehicle, which receives the information from a third party, such as a satellite or another vehicle. The information may be received through inter-vehicle communication. For example, a first vehicle may comprise one or more sensors and gather terrain information and then broadcast the terrain information to a second vehicle.

The information may be received directly from sensing means. Sensing means may comprise one or more cameras, stereoscopic or otherwise, a LIDAR (Light Detection and Ranging) sensor, a sonar sensor, a laser imaging sensor, or a radar sensor. Any suitable sensing means may be used.

Terrain information may be used, for example, to form a three-dimensional map around the vehicle. Terrain information may comprise any suitable information from which a condition of the driving surface may be inferred. The terrain information may comprise information about, for example, the roughness of the driving surface.

A steering recommendation for a vehicle may be provided in any suitable way. For example, the indication may be provided in the form of a visual display or notification, an audible instruction, voice command, or alert, or via a haptic feedback system.

In some situations, such as when the vehicle is operating in an autonomous mode, the steering recommendation may be provided as an electrical signal by the output means to one or more vehicle actuators, systems or system controllers. The system controller may then provide a control signal to its associated system. The systems may include one or more of a vehicle powertrain, braking or steering system. The steering system may be an Electric Power Assisted Steering (EPAS) and, upon receiving the signal, could then adjust the steering angle of one or more steered wheels. This could be done in order to, for example, avoid an obstacle 130 or course correct so as to approach the obstacle 130 from a better angle of attack.

The above embodiments have been described by way of example only, and the described embodiments are to be considered in all respects only as illustrative and not restrictive. It will be appreciated that variations of the described embodiments may be made without departing from the scope of the invention which is indicated by the appended claims rather than by the foregoing description.

The invention claimed is:

1. A method for providing a steering recommendation for a vehicle for negotiating an obstacle, the method comprising:
   receiving terrain information, the terrain information indicative of a surface of an obstacle, the surface facing an approaching wheel of the vehicle;
   determining, from the terrain information, at least one characteristic of the facing surface of the obstacle;
   determining, in dependence on the determined at least one characteristic, a steering recommendation for the wheel to negotiate the obstacle,
   wherein negotiating the obstacle includes finding a way over, through, or around the obstacle;
   wherein determining the at least one characteristic of the surface of the obstacle comprises determining a gradient of the surface; and
   automatically controlling a vehicle steering system based on the steering recommendation.

2. The method according to claim 1, wherein receiving terrain information comprises sensing terrain information using at least one sensor of the vehicle.

3. The method according to claim 1, further comprising determining, from the terrain information, a height of the obstacle.

4. Tue method according to claim 3, further comprising determining that the height of the obstacle is above a threshold value, and wherein providing a steering recommendation for the wheel to negotiate the obstacle comprises providing, in dependence on the determination that the height of the obstacle is above the threshold value, a steering recommendation for the wheel to bypass the obstacle.

5. The method according to claim 1, wherein determining at least one characteristic of the surface of the obstacle comprises determining an angle of the surface relative to a direction of travel of the wheel.

6. The method according to claim 5, wherein providing a steering recommendation comprises providing a recommendation to adjust an angle of the direction of travel of the wheel relative to the surface.

7. The method according to claim 6, wherein the recommendation to adjust the angle of the direction of travel of the wheel relative to the surface comprises at least one of: an indication to adjust the direction of travel of the wheel such that the adjusted direction of travel is substantially perpendicular to a longitudinal horizontal extent of the surface of the obstacle, and adjusting the angle in order to mitigate a risk of damage to the wheel.

8. The method according to claim 1, further comprising monitoring a progression of the vehicle over the terrain, and wherein determining a steering recommendation comprises determining a steering recommendation in dependence on the progression of the vehicle over the terrain and the determined at least one characteristic of the surface.

9. The method according to claim 8, wherein monitoring a progression of the vehicle over the terrain comprises receiving a ground speed signal indicative of a speed over the terrain of the vehicle, and wherein determining a steering recommendation comprises determining a steering recommendation in dependence on the received ground speed signal and the determined at least one characteristic of the surface.

10. The method according to claim 8, further comprising generating a three-dimensional map of the terrain from the received terrain information.

11. The method according to claim 10, further comprising processing the received terrain information in order to generate a three-dimensional map of the terrain outside of a field of view of one or more sensors of the vehicle.

12. The method according to claim 1, wherein providing a steering recommendation for the vehicle comprises at least one of:
providing a visual indication of the steering recommendation; and
providing a haptic indication of the steering recommendation.

13. A non-transitory computer readable medium having instructions stored thereon which, when read by a processor, cause the processor to perform the method according to claim 1.

14. A controller for a vehicle, the controller operable to provide a steering recommendation for the vehicle to negotiate an obstacle, the controller comprising:
a communications module configured to receive terrain information indicative of a surface of an obstacle, the surface facing an approaching wheel of the vehicle;
a processor configured to determine:
a gradient at least one of the surface of the obstacle in dependence on the terrain information, and
a steering recommendation for the wheel to negotiate the obstacle in dependence on the determined gradient; and
an electrical output configured to provide the steering recommendation for use in negotiating the obstacle.

15. The controller according to claim 14, wherein the processor is further configured to determine, from the terrain information, a height of the obstacle and whether the height of the obstacle is above a threshold value.

16. The controller according to claim 14, wherein the processor is further configured to determine, an angle of the surface relative to a direction of travel of the wheel.

17. A system operable to provide a steering recommendation for a vehicle to negotiate an obstacle, the system comprising:
a sensor configured to receive terrain information, the terrain information indicative of a surface of the obstacle, the surface facing an approaching wheel of the vehicle; and
the controller according to claim 14.

18. The system according to claim 17, wherein the sensor comprises at least one of:
a stereoscopic three-dimensional camera;
a rear facing camera;
a radar sensor;
a light detection and ranging, LIDAR, sensor; a sonar sensor; and
a six-axis accelerometer.

19. A vehicle comprising the system according to claim 18.

* * * * *